United States Patent Office 2,707,715
Patented May 3, 1955

2,707,715

UNSATURATED METHYLOL PHENYL ETHERS HAVING AIR-DRYING PROPERTIES AND CONDENSATION PRODUCTS THEREFROM

Robert W. Martin, Lafayette, Calif., assignor to General Electric Company, a corporation of New York No Drawing. Application August 30, 1952,
Serial No. 307,381

6 Claims. (Cl. 260—613)

This invention is concerned with unsaturated phenolic compositions of matter having air-drying properties. More particularly, the invention relates to compositions free of hydrolyzable ester groups and having air-drying properties, said compositions comprising a compound corresponding to the general formula

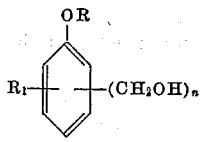

where R is a member selected from the class consisitng of alkyl and hydroxy alkyl groups, R' is an unsaturated aliphatic group, and $n$ is an integer equal to from 1 to 3, inclusive, the benzene ring being free of methylol substitution in the meta positions. The invention also includes condensation products (either partial condensation products or completely condensed products) obtained by condensing either the above compounds individually or mixtures of the foregoing materials.

Conventional air-drying resins based on drying oils and alkyd resins have the disadvantage that because they have hydrolyzable ester groups, the caustic resistance of such materials embodied in coating compositions is relatively poor. Moreover, because of these reactive hydrolyzable ester groups, it is often found that coating compositions containing resins having these ester groups are not as color fast as desired and in addition it is difficult to make coating compositions including such materials in applications requiring light colors.

I have now discovered unexpectedly that I am able to make resins from phenolic derivatives, which when employed in the form of coating compositions have exceptional caustic resistance and are color fast, while at the same time being capable of formulation into light color coating compositions. The materials included in the scope of my invention are air-drying and can be cured quite rapidly by the application of heat for relatively short periods of time if rapid conversion of the coating composition to the tack-free usable state is desired.

In accordance with my invention I use an unsaturated aliphatic-substituted methylol phenyl ether (hereinafter referred to as "methylol phenyl ether") of the formula

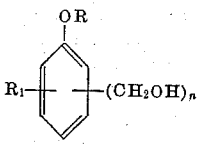

where R, R' and $n$ have the meaning given above. In the above formula R may be, for instance, methyl, ethyl, propyl, isopropyl, butyl, hexyl, hydroxyethyl, hydroxybutyl, etc. R' may be any one of the alkenyl groups, for instance, vinyl, allyl, methallyl, butenyl, etc., radicals. Preferably R is the methyl group and R' is the allyl group.

Although $n$ may be an integer from 1 to 3, it is desirable that $n$ be preferably 2 or where, for instance, mixtures of the methylol phenyl ethers are used, that at least 50% or more of the mixture of methylol phenyl ethers be those in which $n$ equals 2, the remainder of the methylol phenyl ethers being derivatives in which $n$ is 1 or 3.

The method for preparing these methylol phenyl ethers may be varied. One method comprises dissolving an alkenyl phenol, for instance, ortho-allyl phenol, in a concentrated caustic solution, for instance, a sodium hydroxide solution, adding formaldehyde or paraformaldehyde so that the ratio of formaldehyde (or paraformaldehyde) to phenol is from about 1.5 to about 2.2 mols of the former per mol of the phenol. The mixture is advantageously stirred and allowed to react with the unsaturated phenol at around (or below) room temperatures or around temperatures of the order of about 25° to 65° C. for a sufficient length of time, for example, from about 24 to 72 hours, depending on the temperature used, until complete reaction has occurred between the phenol and the formaldehyde. The unsaturated aliphatic-substituted methylol phenol or mixtures of unsaturated aliphatic-substituted methylol phenols can then be etherified by any one of the methods well known in the art. Thus, when one desires to prepare the methyl ether of the unsaturated aliphatic-substituted methylol phenol, one may employ, for instance, dimethyl sulfate with the caustic solution of the unsaturated aliphatic-substituted methylol phenol. The use of dimethyl sulfate will, of course, give a methyl ether of the unsaturated aliphatic-substituted methylol phenol. Thereafter, the reaction product can be separated and washed for example, with aqueous caustic solutions, and with water to give a reaction product which comprises a methylol alkenyl phenyl ether of the formula described above, and more probably a mixture of the various compounds coming within the scope of the above formula.

Instead of using dimethyl sulfate for making the methyl ether of the derivatives described above, one may also use alkyl halides, for instance, methyl chloride, ethyl chloride, propyl bromide, butyl chloride, etc. To obtain the hydroxyalkyl ethers (for instance, a compound having the formula

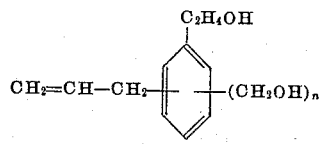

where $n$ is an integer equal to from 1 to 3, inclusive), one may employ epichlorohydrin for the purpose. Generally R should not be unsaturated because unsaturation in the ether position results in poor color (resulting in darkening) in the final product when used as a coating composition.

In making the alkenyl methylol phenyl derivatives, instead of using sodium hydroxide, other fixed alkali catalysts, for instance, potassium hydroxide, sodium carbonate, etc., can be employed with equivalent results. Generally the amount of caustic used should be within the range of from about 1 to 1.5 mols of the fixed alkali catalyst per mol of the phenol derivative or ingredient.

The isolated products comprising compounds corresponding to the formula

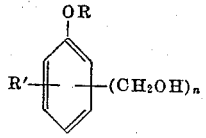

where R, R' and $n$ have the meanings given above, can be employed in various applications, for instance, in coating applications. For this purpose the alkenyl methylol phenyl ether is preferably dissolved in a solvent, for example, benzene, toluene, etc., and small amounts of acidic materials, for instance, sulfamic acid (which is believed to give the best color), aniline sulfate, urea hydrochloride, morpholine sulfate, para-toluene sulfonic acid, etc., preferably in the form of solutions such as methyl or ethyl alcohol solutions, to prevent darkening, may be employed for the purpose.

The amount of acidic catalyst used for converting the aforementioned alkenyl methylol phenyl ethers is generally quite small and may range, for instance, from about 0.001 to about 0.05% or more, by weight, based on the weight of the alkenyl methylol phenyl ether. It is generally desirable to incorporate the acidic condensing catalyst in the alkenyl methylol phenyl ether and body the mixture at elevated temperatures, for instance, at temperatures of from about 175° to 225° C. for times varying from about 30 minutes to about the two hours to increase the degree of condensation so that when later employed in coating applications, the material can be handled more easily and will air-dry more rapidly.

When using the condensed product in coating compositions, it is desirable to employ various driers usually employed in paints or other coating compositions with the partially condensed product to convert it to the substantially completely condensed state. These driers are generally soluble metallic salts of organic acids. Examples of suitable acid radicals yielding the metallic salts are, for instance, the resinates, the linoleates, stearates, oleates, or even the lower acid radicals such as those yielding the acetate, butyrate, etc., radicals providing the resulting salts are soluble in the resinous composition. The metallic ion of such salt may be any one of those usually employed as driers, for instance, lead, tin, magnesium, iron, cobalt, cadmium, copper, barium, chromium, manganese, zinc, aluminum, nickel, mercury, etc. A particular class of driers which may be advantageously employed to accelerate the conversion of the resinous compositions herein described to the substantially tack-free stage within in relatively short periods of time at room temperatures, are the cobalt and lead naphthenate driers. Obviously other metallic salts of naphthenic acid may also be used without departing from the scope of the invention.

The amount of drier employed may, of course, vary depending on the type of resinous composition used, the degree of condensation of the latter, the particular drier employed, etc. Generally, on a weight basis I may use from about 0.001 to 0.2% or more by weight of the metallic salt drier, based on the weight of the resin in the coating composition. After incorporation of the drier or mixture of driers, the coating composition may be applied to any desired surface and permitted to air-dry until a substantially tack-free, hard surface is obtained. Obviously this air-drying may be accelerated by the application of heat. It should be noted that the best color is obtained where the coating composition is permitted to air-dry at room temperature.

When one condenses the alkenyl methylol phenyl ethers of the formula

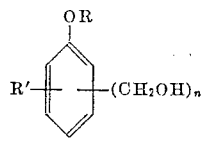

where R, R', and n have the meanings given above, one will obtain polyethers which have the desirable air drying properties described and which obviously are free of hydrolyzable ester groups which are believed to have the inferior caustic resistance. An example of such a polyether structure formed by the condensation of the aforementioned methylol alkenyl phenyl ethers, is one obtained, for example, by condensing a compound having the formula

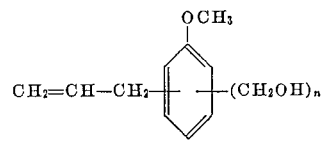

where $n$ is an integer equal from 1 to 3. Generally, compounds of the same formula where $n$ is 2 constitute a majority of the methylol phenol ethers present, and in many instances advantageously comprise from about 50 to 90% or more of the mixture of derivatives. Thus, there may be present in the reaction mixture after condensation with the various acids described above, such polyether structures as, for example,

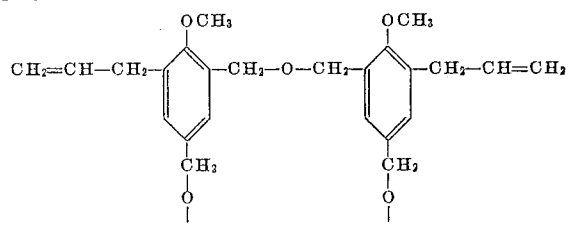

or polymers having the structural unit

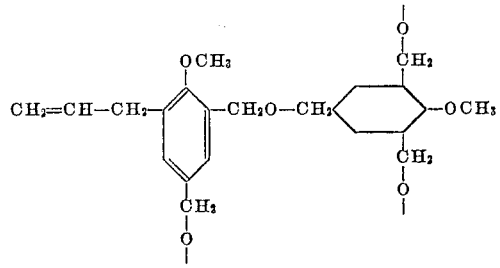

The above description of possible recurring structure units present in the condensation product is based on the fact that the condensation may be effected between methylol groups of adjacent molecules in which the methylol groups are present in the ortho position, or condensation may be affected between methylol groups of adjacent molecules in which one methylol group is in the ortho position of one molecule and one methylol group of the adjacent molecule is in the para position. Obviously, other variations of the above condensation structures may be obtained depending on whether 1, 2 or 3 methylol groups are present on the benzene ring, depending on the position of the methylol group, for example, ortho, meta, or para, and also depending on the position of the alkenyl radical. If the alkenyl radical is in either the ortho or para position, generally the remaining positions ortho or para, will be occupied by one or more methylol groups. The limit in such a case of methylol groups would be that shown above. However, if the alkenyl radical, for example, allyl radical, is substituted in the meta position, then the number of methylol groups which may be disposed around the benzene nucleus may range from 1 to 3. Thus, one may have three methylol groups namely, in the para and two ortho positions, or lesser number of methylol groups, for example, in the ortho and para positions, or only in the ortho or only in the para position. Whatever the configuration, as a result of splitting out water by condensation of adjacent methylol groups, there are obtained polyether derivatives having air-drying properties. If the alkenyl radical occupies the para position, obviously only the ortho positions will be open for substitution with methylol groups. This substitution may then be in one or both ortho positions. The position of the alkenyl and methylol groups around the benzene nucleus will influence the type of products obtainable in the practice of my invention.

In order that those skilled in the art may better under-stand how the present invention may be practiced, the following examples are given by way of illustration and not by way of limitation. All parts are by weight.

Example 1

Ortho-allyl phenol (67 grams) was dissolved in 250 grams of a 10% sodium hydroxide aqueous solution. Ninety grams of 37.2% aqueous formaldehyde was added and allowed to react with the phenol for about 72 hours at 38° to 42° C. The temperature of the reaction mixture was then raised to 70° C. and about 70 grams of dimethyl sulfate was added to the caustic solution over a period of about 20 minutes. The temperature of the reaction mass was kept at 60° to 80° C. for one hour after adding all the dimethyl sulfate. The oil phase which separated was withdrawn and washed twice with 5 N aqueous caustic solution, once with 5 N acetic acid, and twice with water. The oil thus obtained was then heated to about 120° C. to remove the last traces of water. This gave an amber-colored low viscosity oil weighing about 88.6 grams and which comprised a mixture of the following compositions:

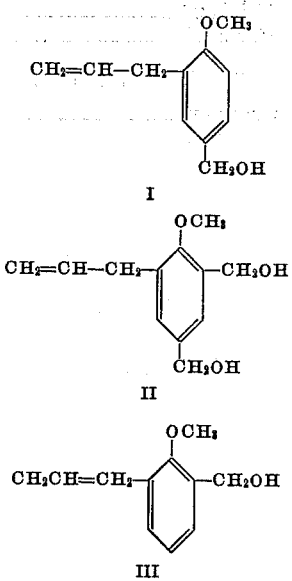

in which compound II was believed to comprise the major proportion of the mixture.

Example 2

Fifty parts of the low viscosity oil obtained in Example 1 was heated with 0.15 part sulfamic acid (added as a 1% solution in methanol) for 75 minutes at 190°–200° C. A barely tack-free light tan resin was thus obtained. This partially condensed resin was dissolved in 50 parts of toluene, to form a coating composition. To 80 parts of the aforementioned toluene resinous solution was added 4 parts of a solution of naphthenate driers containing, by weight, 0.2% cobalt naphthenate and 5.0% lead naphthenate. Two 3-mil wet films were prepared on glass from the resinous solution containing the mixture of driers. One film was baked 30 minutes at 150° C. and one film was allowed to stand at room temperature. The film baked at 150° C. was tack-free when hot, and hard and flexible when cold. The film could hardly be marked by scratching with one's fingernail and the adhesion to glass was exceptionally good.

The film containing the mixture of driers and which was allowed to stand at room temperature, was "dust-free" in 10 minutes, tack-free in 5½ hours, and showed good "through dry" properties in 24 hours. When applied, the film had a faint yellowish tinge, apparently due to the presence of driers, but on standing a few hours, the film became essentially colorless. After remaining 72 hours, at room temperature, the film barely could be scratched with the fingernail. The film was tough, flexible and showed good adhesion.

It will, of course, be apparent to those skilled in the art that instead of employing the alkenyl methylol phenyl ethers described in Examples 1 and 2, other alkenyl methylol phenyl ethers may be used without departing from the scope of the invention. This, one may employ, for example, methallyl methylol phenyl ethers, butenyl methylol phenyl ethers, the ethyl ether of allyl methylol phenol, the hydroxyethyl ether of allyl methylol phenol, etc.

Additionally, other condensing agents for the alkenyl methylol phenyl ethers may also be used in place of sulfamic acid as well as other driers without departing from the scope of the invention. Additional examples of such condensing agents and driers have been mentioned previously.

The compositions herein described can be used for many insulation purposes requiring fast drying. Optimum use of the compositions appears to be in coating applications where these resinous materials are used as bases for enamels or paints, particularly light-colored enamels. In this connection various pigments and dyes may be employed as for instance, titanium dioxide, lithopone, iron oxide, etc., without departing from the scope of the invention. The resinous compositions can also be employed in laminating applications by coating and impregnating various sheet materials, for instance, cloth, glass fabrics, asbestos cloth, etc., and superposing the various sheets, and heating them under pressure to give compact laminated panels having good caustic resistance.

Because of the presence of the unsaturated alkenyl radical in the molecule, the compositions herein described may be copolymerized with other unsaturated materials, for instance, styrene, unsaturated polyesters, triallyl cyanurate, diallyl phthalate, vinyl acetate, etc., using various vinyl polymerization catalysts as, for example, benzoyl peroxide, tertiary butyl perbenzoate, etc., to give new resinous mixtures which may have additional application in the laminating, molding, casting, or insulating arts.

What I claim as new and desire to secure by Letters Patent of the United States is:

1. A composition of matter corresponding to the general formula

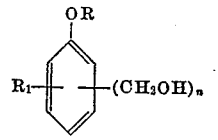

where R is a member selected from the class consisting of alkyl and hydroxyalkyl radicals, R' is an alkenyl radical, and $n$ is an integer equal to from 1 to 3, inclusive, the benzene ring being free of methylol substitution in the meta positions.

2. A composition of matter corresponding to the general formula

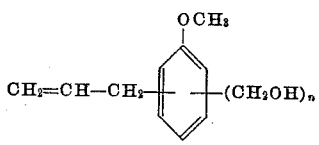

where $n$ is an integer equal to from 1 to 3, inclusive, the benzene ring being free of methylol substitution in the meta positions.

3. A composition of matter corresponding to the general formula

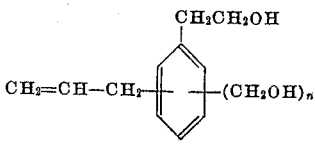

where *n* is an integer equal to from 1 to 3, inclusive, the benzene ring being free of methylol substitution in the meta positions.

4. A composition of matter consisting essentially of a mixture of ingredients corresponding to the general formula

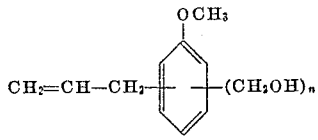

where *n* is an integer equal to from 1 to 3, inclusive, the benzene ring being free of methylol substitution in the meta positions.

5. A composition having air-drying properties and being free of hydrolyzable ester groups, the said composition having been obtained by condensing under the influence of heat and in the presence of a condensation catalyst a compound having the formula

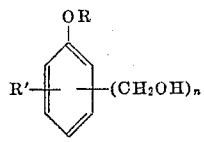

where R is a member selected from the class consisting of alkyl and hydroxylalkyl radicals, R' is an alkenyl radical, and *n* is an integer equal to from 1 to 3, inclusive, the benzene ring being free of methylol substitution in the meta positions.

6. A composition having air-drying properties and being free of hydrolyzable ester groups, the said composition having been obtained by condensing under the influence of heat and in the presence of a condensation catalyst a compound having the formula

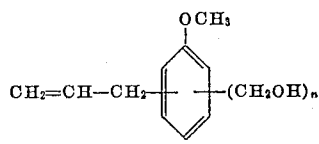

where *n* is an integer equal to from 1 to 3, inclusive, the benzene ring being free of methylol substitution in the meta positions.

References Cited in the file of this patent

UNITED STATES PATENTS

| 2,457,074 | Weinkauff | Dec. 21, 1948 |
| 2,579,329 | Martin | Dec. 18, 1951 |

FOREIGN PATENTS

| 544,388 | Germany | Feb. 19, 1932 |